United States Patent
Haywood

(10) Patent No.: US 9,353,451 B2
(45) Date of Patent: May 31, 2016

(54) HYDROLYSIS SYSTEM AND METHOD FOR A VEHICLE ENGINE

(71) Applicant: Jim Harold Haywood, Alma, AR (US)

(72) Inventor: Jim Harold Haywood, Alma, AR (US)

(73) Assignee: Fuel and Emissions Controls, LLC, Pasadena, TX (US)

( * ) Notice: Subject to any disclaimer, the term of this patent is extended or adjusted under 35 U.S.C. 154(b) by 228 days.

(21) Appl. No.: 14/257,989

(22) Filed: Apr. 21, 2014

(65) Prior Publication Data

US 2014/0367272 A1    Dec. 18, 2014

Related U.S. Application Data

(60) Provisional application No. 61/814,033, filed on Apr. 19, 2013.

(51) Int. Cl.
| | |
|---|---|
| *C25B 1/08* | (2006.01) |
| *C25B 15/08* | (2006.01) |
| *C25B 9/20* | (2006.01) |
| *F02M 25/12* | (2006.01) |
| *F02B 43/10* | (2006.01) |

(52) U.S. Cl.
CPC . *C25B 15/08* (2013.01); *C25B 1/08* (2013.01); *C25B 9/203* (2013.01); *F02M 25/12* (2013.01); *F02B 2043/106* (2013.01)

(58) Field of Classification Search
CPC .............. C25B 1/02; C25B 1/04; C25B 1/08; C25B 9/203; C25B 15/08; F02M 25/12; F02B 2043/106
See application file for complete search history.

(56) References Cited

U.S. PATENT DOCUMENTS

| | | | |
|---|---|---|---|
| 2004/0031390 A1* | 2/2004 | Myasnikov | B01D 53/02 96/146 |
| 2011/0005939 A1* | 1/2011 | Haywood | C25B 1/04 205/630 |
| 2012/0058405 A1* | 3/2012 | Kirchoff | C25B 1/04 429/422 |
| 2012/0298054 A1* | 11/2012 | Dinsmore | F02B 43/10 123/3 |

FOREIGN PATENT DOCUMENTS

GB    WO 2011138588 A1 *   11/2011   ............. F01M 13/00

* cited by examiner

*Primary Examiner* — Nicholas A Smith
(74) *Attorney, Agent, or Firm* — Larry E. Severin

(57) ABSTRACT

A hydrolysis system for a vehicle engine includes an electrolysis unit having a plurality of spaced, generally parallel, conductive plates and an electrolyte between the plates that produce fuel gas including hydrogen and oxygen by electrolysis; a reservoir that receives the fuel gas from the electrolysis unit and stores the fuel gas and electrolyte; an electric pump that pumps the electrolyte from the reservoir to the electrolysis unit; a pulse width modulator that provides DC power to the conductive plates and to the pump; a dryer having a filter that removes water from the fuel gas; an expansion tank having an interior cavity that expands the fuel gas and a conduit within the cavity that heats the fuel gas with circulating hot water; and a spray tube that outputs the fuel gas. Methods include preparing and using the hydrolysis system.

20 Claims, 5 Drawing Sheets

HYDROLYSIS SYSTEM AND METHOD FOR A VEHICLE ENGINE

RELATED APPLICATIONS

This application claims the benefit of the filing date of U.S. Patent Application No. 61/814,033, filed Apr. 19, 2013, which is incorporated herein by reference in its entirety.

BACKGROUND OF THE INVENTION

The present invention generally relates to internal combustion vehicle engines and more specifically to a hydrolysis system and method for a vehicle engine.

Existing internal combustion engines for automobiles may burn only 20% of the carbon in the gasoline or diesel fuel. Carbon is sent to a catalytic converter, which is wasteful, and produces emissions that include noxious gasses and green house gasses, such as carbon monoxide (CO), carbon dioxide ($CO_2$), and nitrous oxide (NO). The use of on-board electrolysis in producing small amounts of hydrogen and oxygen gasses into the air intake of an internal combustion engine may increase mileage and reduce emissions from the automobile.

Existing automobiles with electronic fuel injection (EFI) have an engine control unit (ECU), which is a computer that reads values from sensors and provides signals to adjust or control the engine. Traditional air intake boxes for an automobile air box keeps the air clean by removing particles with a filter, but do not warm the air. When the air is cold, mileage drops because the denser air mass causes the automobile's ECU computer (or an independent control system) to put more fuel into the engine.

It would be therefore be desirable to have a device that may be useful to an individual, business or corporation who desires or needs a reduction in fuel consumption and has a desire to reduce emissions, such as, for example trucking companies, police departments, school systems, individuals who commute to and from work, and others who wish to reduce emissions.

SUMMARY OF THE INVENTION

In one aspect of the present invention, a device includes an electrolysis unit having a plurality of spaced, generally parallel, conductive plates and an electrolyte between the plates that produce fuel gas including hydrogen and oxygen by electrolysis; a reservoir that receives the fuel gas from the electrolysis unit and stores the fuel gas and electrolyte; an electric pump that pumps the electrolyte from the reservoir to the electrolysis unit; a pulse width modulator that provides DC power to the conductive plates and to the pump; a dryer having a filter that removes water from the fuel gas; an expansion tank having an interior cavity that expands the fuel gas and a conduit within the cavity that heats the fuel gas with circulating hot water; and a spray tube that outputs the fuel gas In another aspect of the present invention, a system for a vehicle having an engine, a radiator, and a battery includes an electrolysis unit having a plurality of spaced, generally parallel, generally circular conductive plates and an electrolyte including liquid ammonia between the plates that produce fuel gas including, hydrogen vapor, oxygen vapor, and ammonia aerosol; the plates including a front faceplate and a rear faceplate having a common negative electrical connector, a central interior plate having a positive electrical connector, and a plurality of neutral plates not directly electrically connected; the rear plate being solid, and the front and interior plates having lower and upper crescent-shaped apertures that align with each other and form passages to pass electrolyte in through the lower apertures and fuel gas out through the upper apertures; a reservoir that receives the fuel gas from the electrolysis unit and stores the fuel gas and electrolyte; an electric pump that pumps the electrolyte from the reservoir to the electrolysis unit; a pulse width modulator that receives power from the battery and provides DC power to the conductive plates and to the pump; a dryer having a mesh cloth filter that removes water from the fuel gas; an expansion tank having an interior cavity that is larger than a fuel gas input line to expand the fuel gas, and a conduit within the cavity that heats the fuel gas with circulating hot water from the radiator; a plurality of fuel gas conduits having a conduit constricting element at one or both ends, thereby increasing a velocity of the fuel gas that passes through the conduit; a spray tube that feeds the fuel gas into an air intake of the engine; and an air box that with a heating element that heats and filters fresh air and provides the air to the air intake of the engine, the heat element including either an electric lamp powered by the battery or a hot water conduit that circulates hot water from the radiator In yet another aspect of the present invention, a method for providing fuel gas includes providing an electrolysis unit having conductive plates; providing an electrolyte for the electrolysis unit that includes ammonia; utilizing an electrolysis unit to produce fuel gas including hydrogen and oxygen; storing the fuel gas and electrolyte in a reservoir; pumping the electrolyte from the reservoir to the electrolysis unit; powering the conductive plates and the pump with a pulse width modulator; filtering and drying the fuel gas to remove water; expanding and heating the fuel gas with circulating hot water; and spraying the fuel gas out.

DETAILED DESCRIPTION

Figure 1:
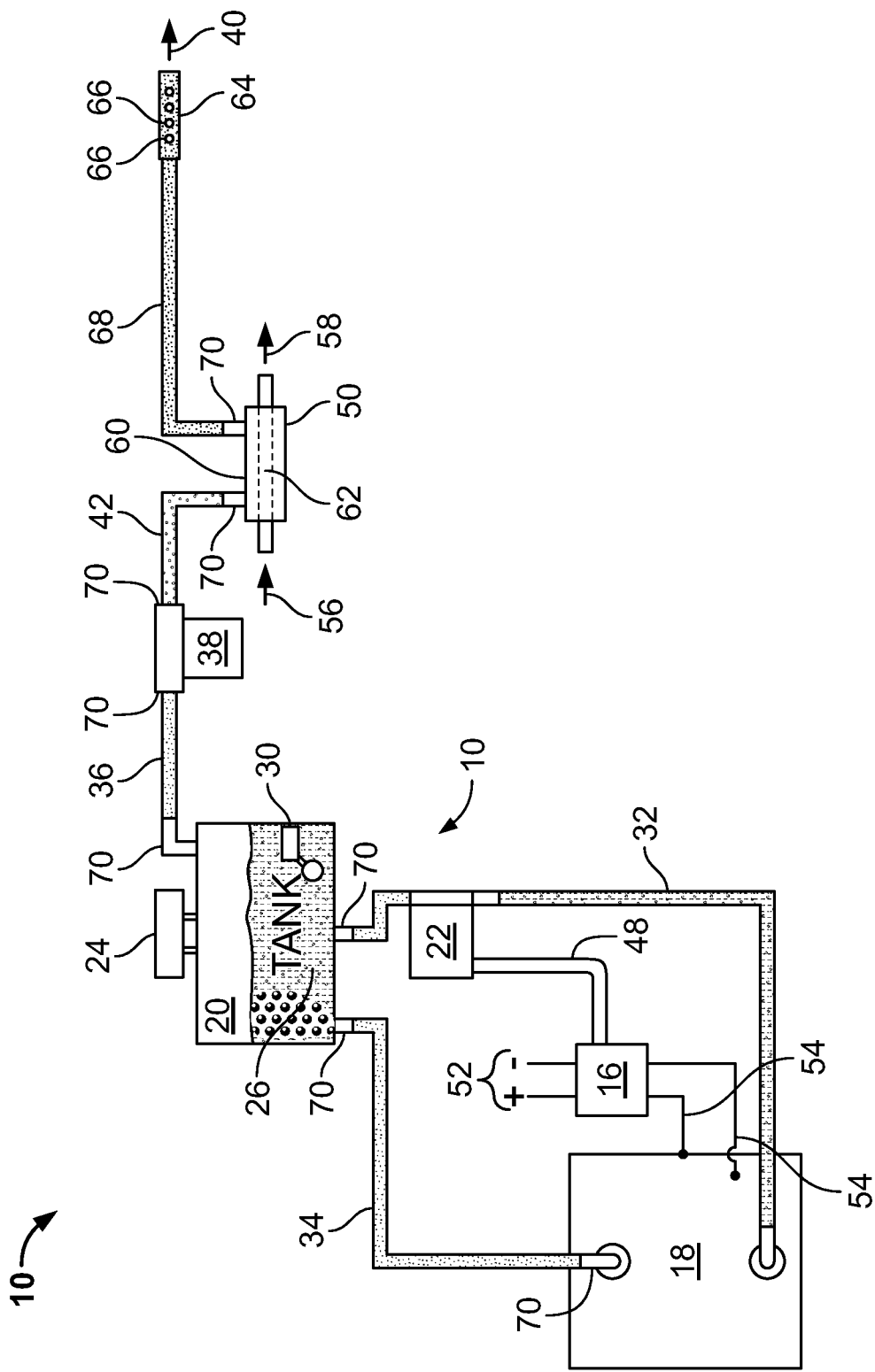
FIG. 1 depicts a schematic of an embodiment of a hydrolysis fuel gas unit according to the present invention.

The preferred embodiment and other embodiments, which can be used in industry and include the best mode now known of carrying out the invention, are hereby described in detail with reference to the drawings. Further embodiments, features and advantages will become apparent from the ensuing description, or may be learned without undue experimentation. The figures are not necessarily drawn to scale, except where otherwise indicated. The following description of embodiments, even if phrased in terms of "the invention" or what the embodiment "is," is not to be taken in a limiting sense, but describes the manner and process of making and using the invention. The coverage of this patent will be described in the claims. The order in which steps are listed in the claims does not necessarily indicate that the steps must be performed in that order.

An embodiment of the present invention generally provides a hydrolysis system and method for a vehicle engine.

Embodiments of the present invention generally include a hydrolysis system or unit that produces a gas (referred to herein as "fuel gas") for a vehicle engine, such as an internal combustion engine for an automobile or truck. Embodiments may be self-contained units that are connected to an automobile or other vehicle's battery and engine air intake. Applications are on the highway, marine, air, and construction/industrial. Embodiments may utilize on-board electrolysis to provide hydrogen gas or other gasses to the engine. This injection of hydrogen (aka HHO injection) may help burn automobile fuel (such as gasoline or diesel fuel) that is otherwise exhausted, and therefore improve mileage and reduce emissions. The system contributes to a clean burn in the cylinder of the internal combustion engine, provides ancillary energy to the vehicle, and may reduce noxious emissions. Embodiments may be provided as an add-on or may be already-installed in a vehicle.

Embodiments of a hydrolysis cell may produce a fuel gas that includes gaseous hydrogen (H2), oxygen (O2), and ammonia (NH3). The H2 and O2 provide desirable negative and positive ions, respectively. The ammonia in the fuel gas may exist as an aerosol, and the hydrogen and oxygen as vapor. The fuel gas rises from the hydrolysis cell and is pumped into a tank that may also contain a reserve of electrolyte including ammonia. The fuel gas is piped out of the reservoir, further treated (dried, heated, expanded, and atomized), piped out of the hydrolysis system, and mixed into the air source for the automobile engine. Embodiments may employ the Venturi effect to help empty the electrolysis system of fuel gas and provide it to the automobile's air intake manifold. Liquid ammonia and water should be added to the system by the user when needed to replenish these materials as they are consumed.

In conjunction with or independent from the hydrolysis system, an embodiment of an air box heater heats the fresh air into the automobile's air intake manifold. This may help the engine start on cold days, may improve mileage, and in conjunction with the hydrolysis system may enhance the engine's utilization of the fuel gas to provide an even greater improvement in mileage.

As depicted in the embodiment of FIG. 1, a hydrolysis fuel gas unit 10 may include an electrolysis unit 18, which is a hydrogen production cell containing electrolyte and hydrolysis plates. The electrolysis unit 18 provides fuel gas to an electrolyte tank 20. Condensed and reserve electrolyte 26 is returned from the electrolyte tank 20 to the electrolysis unit 18 via a circulation pump 22. Both the electrolysis unit 18 and the pump 22 may be controlled by a pulse width modulator 16 powered by the vehicle battery. Fuel gas in the electrolyte tank 20 may be kept under pressure, and when demanded, fuel gas is provided through a dryer 38 and an expansion tank 50, warmed, and output from a spray tube 64.

An embodiment of a hydrolysis fuel gas unit 10 may receive power through from an external power source 52, such as a 12-volt automobile battery or a dry cell. Embodiments of a pulse width modulator ("PWM") 16 may provide power to the electrolysis unit 18 through electrolysis power lines 54, and through pump power lines 48 to an electrolyte circulation pump 22. PWM 16 allows the user to control the amperage allowed to an electrolysis unit 18, so that the system does not come on until the alternator is in operation.

In embodiments, when the engine is idle, PWM 16 may allow only a relatively small amount of current, such as for example 8 amps, to produce only a relatively small amount of fuel gas. When the vehicle accelerates, PWM 16 will provide more current which in turn creates more Hydrogen. This may be desirable, because the engine is drawing more gasoline and the system is adding automobile fuel gas when it is really needed. Embodiments may create a balance of fuel mixture, whether at idle or during acceleration.

In an embodiment for turbo-diesel automobile engines (not shown), a pressure switch may provide a signal to the PWM 16. The switch may be positioned on the pressure side of a turbo and may have at least two modes to set different amperages in PWM 16. If the pressure is less than a preset amount, for example 20 psi, then the switch is in a low position and PWM 16 will output a low preset amount of current to provide a relatively low rate of hydrolysis in the electrolysis unit 18. When the pressure his higher, the switch is high for a higher rate of hydrolysis. This may be especially helpful when starting the engine or in cold weather.

An electrolysis unit 18 may be a fuel cell or hydrogen-cell that utilizes an electrolyte such as ammonia for hydrolysis. Gaseous hydrogen, oxygen, and aerosol electrolyte (including aerosol ammonia) from the electrolysis unit 18 may be delivered through an HHO gas in line 34 to an electrolyte tank 20 or other reservoir. The electrolyte tank 20 is a reservoir for liquid reserve electrolyte 26 and droplets of electrolyte that condense out of the fuel gas, and it also stores pressurized gaseous fuel gas so the fuel gas can be output from the system when needed.

The fuel gas may bubble up through the reserve electrolyte 26 and be collected within the upper portion of the airtight electrolyte tank 20. The electrolyte tank 20 may be bolted or otherwise mounted to a vehicle, and may have a removable cap 24 on the top so that electrolyte and water may be added as needed. To ensure safety, electrolyte tank 20 may contain a float switch 30, and when the switch 30 detects that the reserve electrolyte 26 in the tank falls to 15% or less, the entire hydrolysis unit may shut off. The electrolyte may have an alkaline PH, such as ammonia with PH 12, combined with water.

Condensed liquid electrolyte and reserve electrolyte 26 in the electrolyte tank 20 may be returned to the electrolysis unit 18 as needed using a circulation pump 22 that may run continuously during operation. The electrolyte circulation pump 22 may pump liquid from the electrolyte tank 20 to the electrolysis unit 18 through an electrolysis recharge line 32. This may help blow the bubbles of hydrogen and oxygen off of the plates in the electrolysis unit 18, as well as help provide pressure and urge the mixture of hydrogen, oxygen, and electrolyte to pass through the fuel gas lines. Ammonia and distilled water may be provided to the electrolyte tank 20 as needed to top off the reserve electrolyte 26 utilizing a removable and replaceable cap 24. The pump may receive power through pump power lines 48 from the PWM 16.

Embodiments may include a dryer 38 that dries the fuel gas through a filter. The dryer 38 is positioned either just before or inside of the expansion tank 50. The gas passes from the electrolyte tank 20 via an HHO gas out line 36 to the dryer 38, and the filter removes moisture from the gas. Embodiments of a filter may be a 5 micron nylon cloth fiber or other mesh filter. The filter fills a cross section of the dryer 38 so that fuel gas passing through the dryer 38 passes through the filter.

In a first embodiment as depicted in FIG. 1, fuel gas from a separate dryer 38 may be provided through a dried fuel gas line 42 to the expansion tank 50.

In a second embodiment (not shown), the dryer 38 and its filter are located immediately inside the expansion tank 50, the HHO gas out line 36 feeds directly into the expansion tank 50, and a separate dried fuel gas line 42 is unnecessary.

Expansion tank 50 may have a chamber 60 that is larger than the input fuel line, so the gas expands. Expansion tank 50 may also be a gas heater or warmer, and have a hot water input 56 that receives hot water from the radiator, a hot water conduit 62 or pipe that goes through the tank carrying the hot water, and a hot water output 58 that returns the water back to the radiator. The hot water passes through the hot water conduit 62 inside expansion tank 50, and the fuel gas from the dried fuel gas line 42 (or HHO gas out line 36) is warmed by passing over the hot water conduit 62 in an air-tight chamber 60 formed by the walls of the expansion tank 50. The fuel gas expands because the chamber 60 is larger than the input fuel gas line. The expansion increases the volatility of the existing hydrogen ions and produces additional hydrogen ions from the reaction of heat with ammonia gas. The heat warms the air in the chamber 60, so that the volatility of H ions is maintained. The heat also removes moisture from the fuel gas to help prevent water and ammonia from going into the engine. The hot water conduit 62 may be a straight tube, a coiled tube, or other liquid-tight passageway made of heat-conductive material such as copper.

When the automobile accelerates, the air intake of the engine increases vacuum pressure, which draws more automobile fuel and also draws more fuel gas from the fuel gas expansion tank. The hydrolysis unit builds up pressure of fuel gas, and then when the automobile accelerates, the engine may naturally draw more fuel gas into the engine. In embodiments, no additional pumps are needed to transport the fuel gas from the hydrogen production cell to the engine air intake.

After expansion tank 50 allows the gas to expand, the fuel gas may then be sent through a hot expanded fuel gas line 68 to a spray tube 64 or atomizer, which then feeds the fuel gas to the air intake of the vehicle's engine. This may help maintain the volatility of the Hydrogen ions. Embodiments may have differently sized pores 66 or perforations on the spray tube 64 for different types of internal combustion engine. Different types of engines may require a specific diameter and number of pores 66 in the spray tube 64, such as for example 4 pores, with smaller holes for smaller engines.

In embodiments, the tubes or conduit for transmitting fuel gas from the electrolysis unit 18 to the expansion tank 50 (namely, lines 34, 36, and 42) may have a first, larger diameter such as for example ⅜", and the last fuel gas conduit (line 68) may have a smaller diameter such as for example ¼". This may allow pressure to build up in expansion tank 50 and the rest of the hydrolysis fuel gas unit 10, which increases the velocity of external fuel output 40 that is fed to the air intake of the engine.

In embodiments, the fuel gas conduits (lines 34, 36, 42 and 68) may further include a conduit constricting element 70 at one or both ends. The orifices at each junction are restricted by the conduit constricting elements 70 so that the fuel gas stream passes from an area of higher pressure to low pressure at each junction, and therefore flows at a higher velocity.

Figure 2:
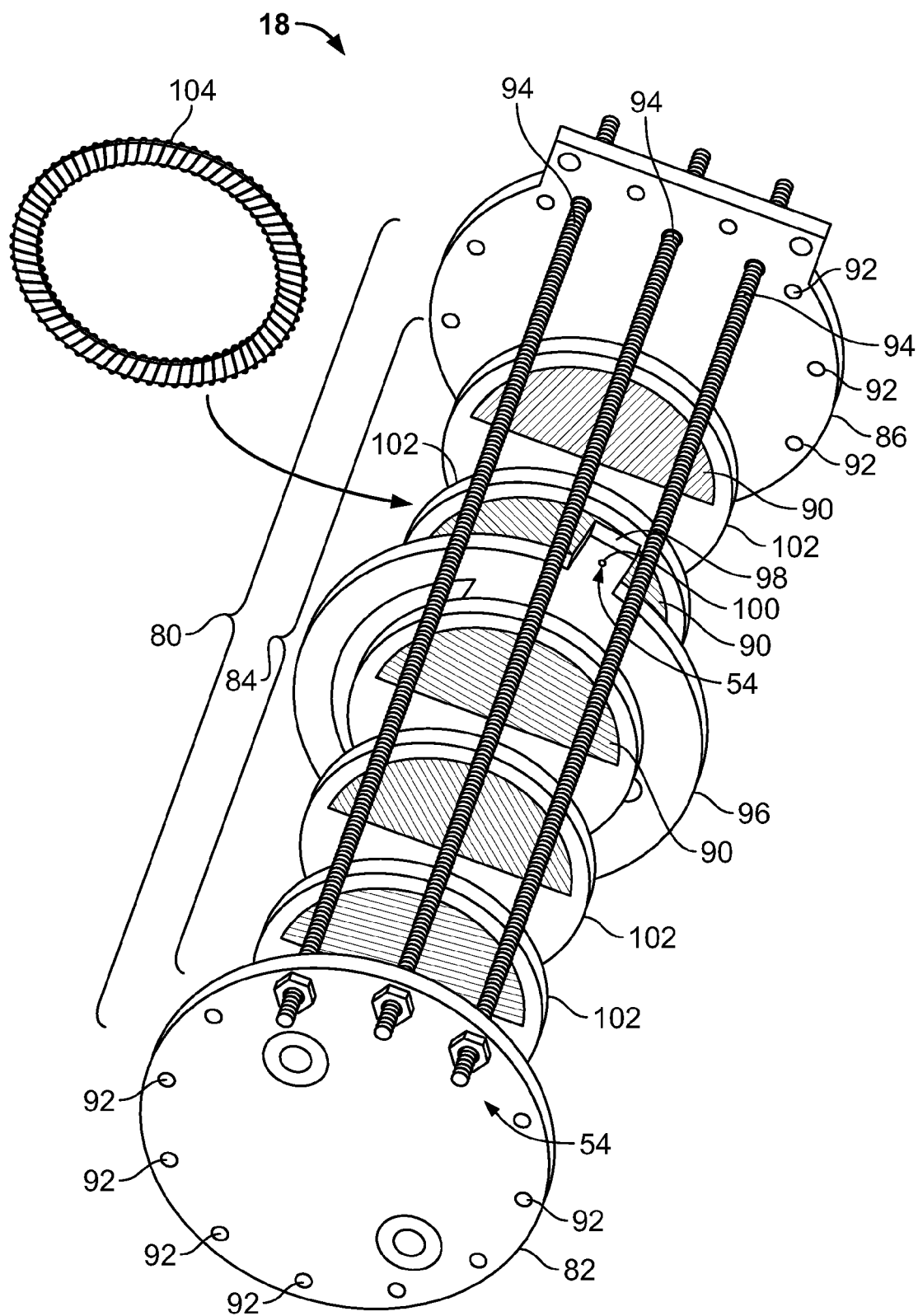
FIG. 2 depicts an electrolysis unit according to the embodiment of FIG. 1.

As depicted in the embodiment of FIG. 2, an electrolysis unit 18 may include a plurality of spaced, generally parallel, generally circular hydrolysis plates 80 separated by electrolyte. The plates 80 may be highly conductive, and may be made of silicon, stainless steel, nickel, silicone, and/or conductive plastic (polymer). Embodiments of an electrolyte may be a liquid rich in ions, and preferably ammonia. The electrolysis unit 18 receives pulsed DC electric current from PWM and applies it to the hydrolysis plates 80 so that they produce fuel gas.

The plates 80 may be organized as −NN+NN−, with negative front and rear faceplates 82, 86 electrically connected to a negative lead, a positive central (or nearly central) plate 96 electrically connected to a positive lead, and with two neutral plates 102 between each positive and negative plate. The neutral plates 102 may help control the voltage or potential from plate to plate. Adding plates will reduce the total voltage drop per plate, to help reduce heat and improve efficiency at low amperage. Other embodiments may include up to 10 plates in various configurations, such as −NN+NN+NN− (with two central interior plates having the same polarity connections) or +NN−NN+ (swapping the positive and negative connections).

In an embodiment, the interior plates 84 (all the plates except the front faceplate 82 and the rear faceplate 86) have a relatively small, round, lower aperture 88 or round hole near the bottom and a larger, crescent-shaped, upper aperture 90 or hole near the top. When installed in the electrolysis unit 18, the apertures 88, 90 of the interior plates 84 align with each other and form straight passages that allow fluids to flow through. The upper, larger aperture 90 allows the fuel gas that accumulates to pass through the interior plates 84, and the lower, smaller aperture 88 is to pump and recirculate the ammonia or other electrolyte through the electrolytic cells. The upper aperture 90 may have a generally flat lower edge, parallel with and above the level of the liquid electrolyte, and the upper edge may form an arc that conforms to the outer rim of the circular plates 80. The upper aperture's shape may utilize otherwise wasted space on the electrolysis plates may help remove all of the fuel gas from the hydrolysis unit without heating up the system, so that the system runs cooler and produces more fuel gas at lower currents.

The outer front and rear faceplates 82, 86 may have bolt holes 92 on the far outside edge of each faceplate 82, 86, such as 12 equally-spaced bolt holes 92, so they can be electrically connected with conductive bolts 94 through electrolysis power lines 54 to a negative lead from the PWM. The faceplates 82, 86 have a larger radius than the interior plates 84, so that the interior plates 84 do not come in contact with the negatively-connected conductive bolts 94

Figure 3A:
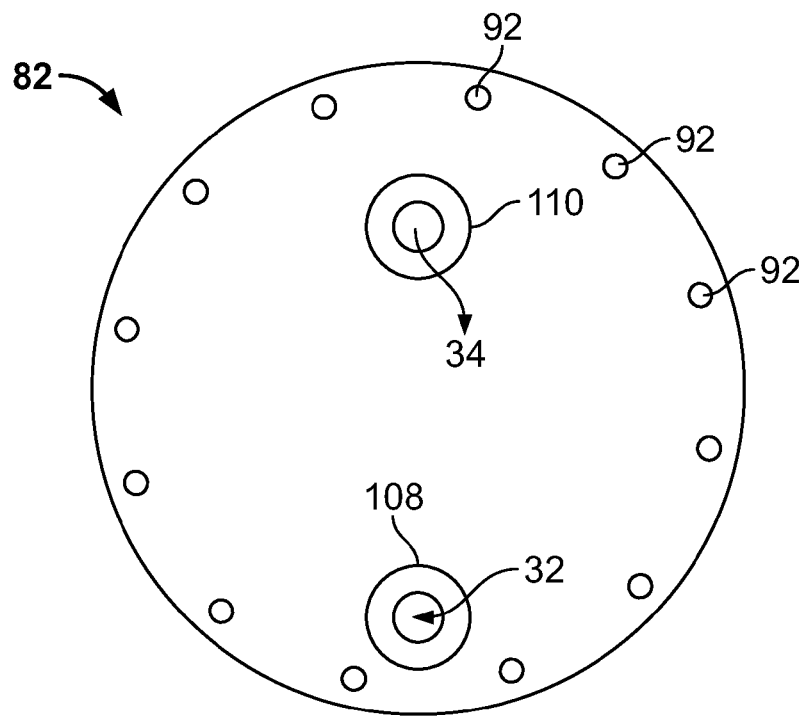
FIG. 3A depicts a front faceplate according to the embodiment of FIG. 1.

As depicted in FIG. 3A, an embodiment of a front faceplate 82 may have a lower fitting 108 and an upper fitting 110. The lower fitting 108 aligns with the lower (round) apertures in the interior plates, and the upper fitting 110 aligns with the upper (crescent-shaped) apertures in the interior plates. The lower fitting 108 receives electrolyte from the electrolysis recharge line 32 and provides it into the lower apertures, to wash over all the hydrolysis plates, and the upper fitting 110 receives fuel gas from the upper apertures and provides it out of the electrolysis unit and into the electrolysis gas line 34.

Figure 3B:
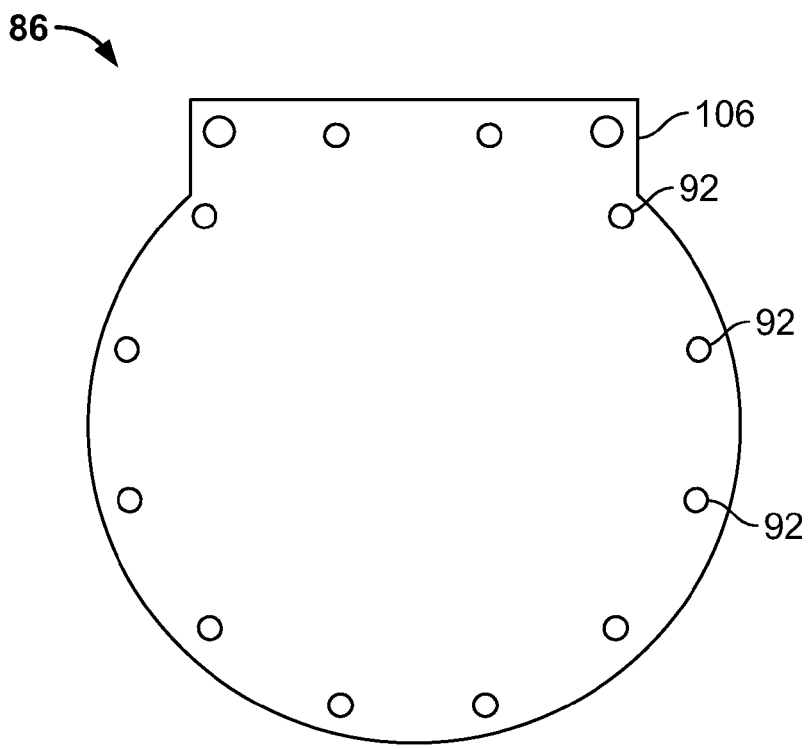
FIG. 3B depicts a rear faceplate according to the embodiment of FIG. 1.

As depicted in FIG. 3B, an embodiment of a rear faceplate 86 may have a mounting bracket or flange 106 with mounting holes to help mount the electrolysis unit in a vehicle near the engine. The rear faceplate 86 may be a solid piece, to form an air and water-tight end for the electrolysis unit. If the rear faceplate 86 is mounted directly to the metal frame of a vehicle, the faceplates will become "grounded" to the vehicle, so may be desirable for the faceplates to be powered with negative voltage if the vehicle battery negative lead is also grounded to the frame.

Figure 3C:
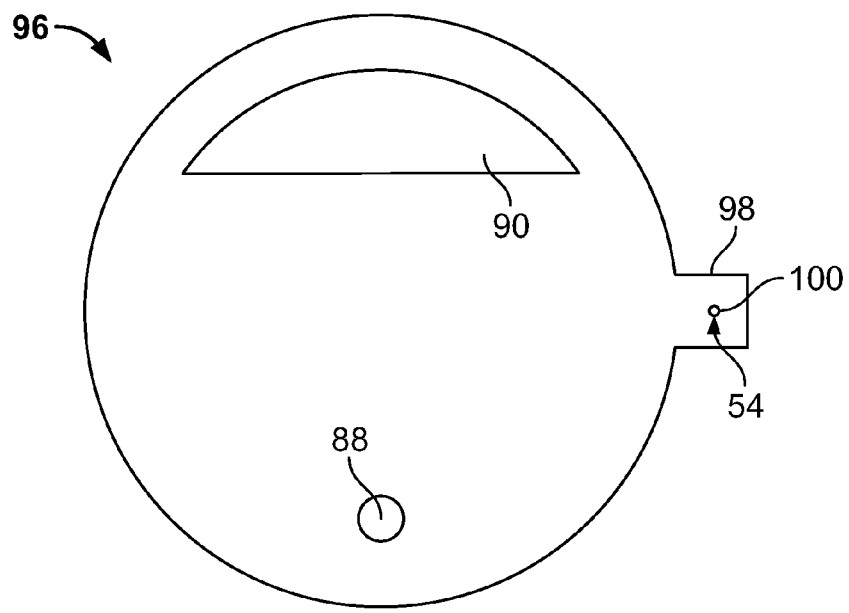
FIG. 3C depicts a central plate according to the embodiment of FIG. 1.

As depicted in FIG. 3C, an embodiment of a central plate 96 or nearly-central interior plate may have an electrical connection tab 98 with an electrical connection aperture 100 that extends from the plate's rim and between the conductive bolts of the outer faceplates so that the tab 98 can be electrically connected with a bolt or wire through electrolysis power lines 54 to a positive lead from the PWM. Embodiments may have a second central, positive interior plate, with the positive plates separated by additional neutral plates. The central plate 96 is "central" in that some embodiments have a single central plate in the middle (such as a −NN+NN− configuration), but other embodiments may have 2 positively-charged central plates 96 (such as a −NN+NN+NN− configuration).

The remaining interior plates 84 may be neutral plates 102, not connected to any power source. They should have the same radius as the central plate 96, but without any electrical connection tab. All the interior plates 84 including the central plate 96 have matching lower apertures 88 and crescent-shaped upper apertures 90.

The hydrolysis plates 80 may all be "generally circular" in that they are either a disk (such as the front faceplate 82 and the neutral plates 102), or they have a circular disk-like portion with extensions (such as the rear faceplate 86 having a mounting flange 106, and the central plate 96 having an electrical connection tab 98). The plates may be "generally parallel" in that they have flat surfaces for electrolysis that are stacked face-to-face but do not touch each other.

The hydrolysis plates 80 may have gaskets 104 between them, to provide a water and gas-tight seal between the plates 80, yet allow the electrolyte to bathe the spaces between the plates 80 for electrolysis. The gaskets 104 may include rubber or other elastic rings around the edges of the plates. The size of the gaskets 104 may vary according to the size of the unit, such as from 3/32" to 1/8" in thickness and of appropriate diameter to match the plates 80. The electrolysis plates 80 themselves may provide the housing for the electrolysis unit 18.

Embodiments may include an air warmer inside a heated automobile air box 110 that heats the air before it flows into the automobile air intake manifold. This may help start the engine on cold days and increase mileage. Cold air passes into the air box 110, perhaps near the bottom, becomes warmed, passes through the automobile's air filter, and then the warm air passes out of the air box, perhaps near the top. The heated air then passes to the air intake manifold of the automobile. The warmer air mass may allow the vehicle's ECU to cut back and run more efficiently, especially in cold temperatures.

Figure 4:
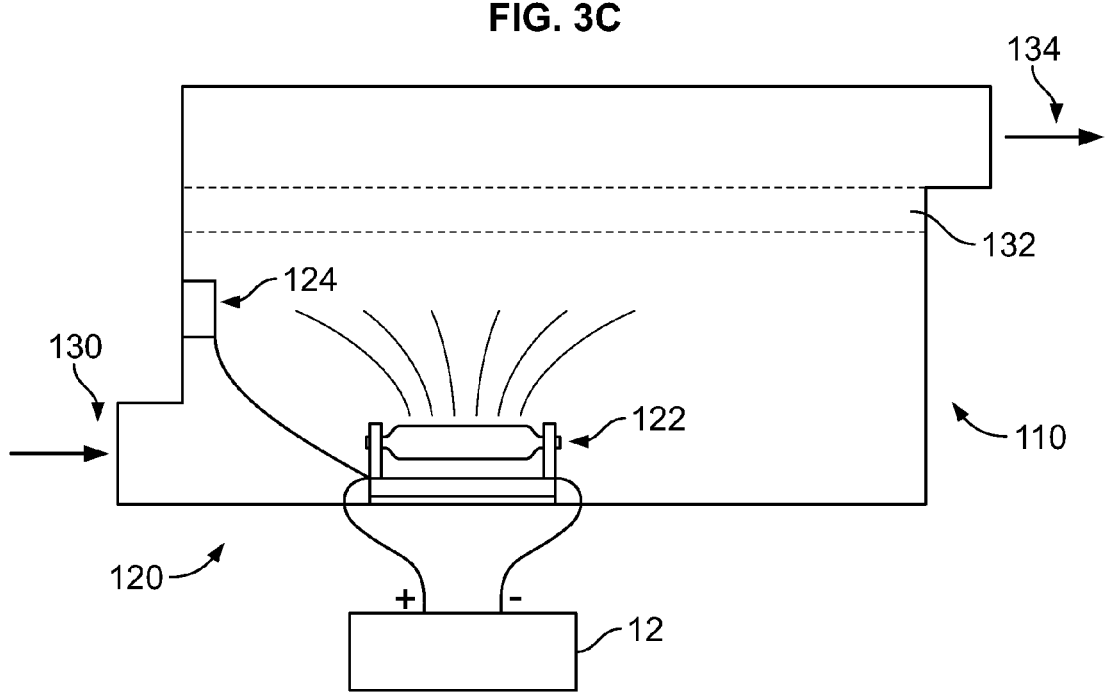
FIG. 4 depicts a first embodiment of an air box according to the present invention.

As depicted in FIG. 4, in a first embodiment, an air box 120 has a halogen lamp 122 or other heating element and a thermostat 124. The lamp 122 and thermostat 124 are powered by the automobile battery 12. The thermostat 124 is positioned at a distance from the lamp 122 so that that the thermostat 124 can measure the temperature of the air in a portion of the air box and provide a signal to the lamp 122 to control whether the lamp 122 is on or off. Fresh, cold air enters through an air box intake 130, flows around and past the lamp 122 to become heated, continues through the air filter 132, and flows out an air box output 134.

Figure 5:
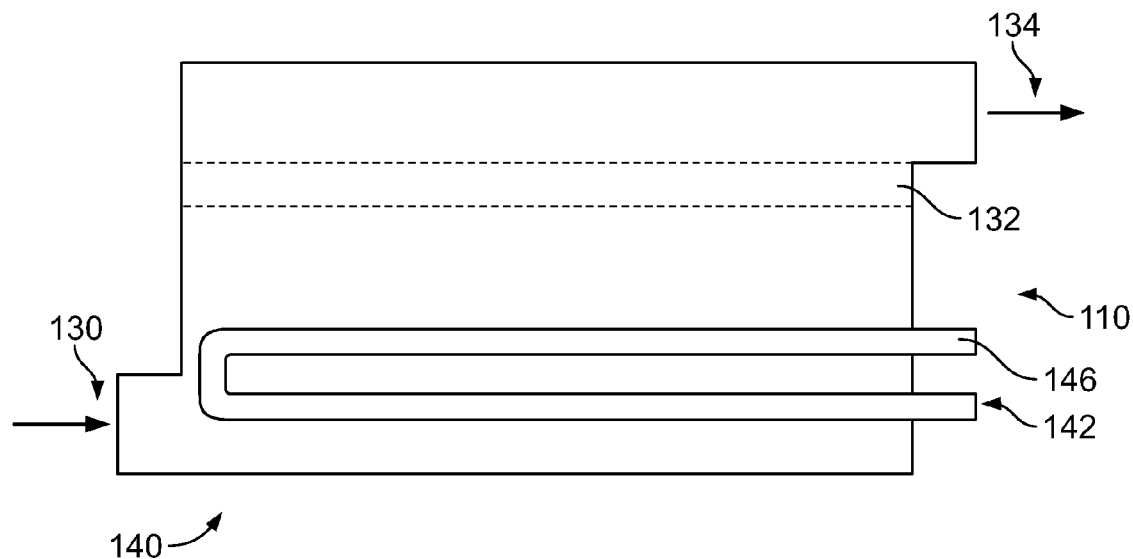
FIG. 5 depicts a second embodiment of an air box according to the present invention.

As depicted in FIG. 5, in a second embodiment, an air box 140 has a hot water inlet 142 and hot water outlet 144 that receives and returns hot water from the automobile's radiator. The hot water circulates through an air heater conduit 146, which may include of a U-shaped tube made of heat-conductive material such as copper. Fresh, cold air enter enters through an air box intake 130, flows around and past the air heater conduit 146 to become heated, continues through the air filter 132, and then flows out an air box output 134. A shut-off system (not shown) may also be provided to shut off the air heater when the air is hot, such as on a summer day.

In either embodiment, if any ammonia not yet converted to hydrogen, then the warming of the cold air may accelerate the development of hydrogen gas. This may also dilute the air, so that the ECU cuts back.

Figure 6:
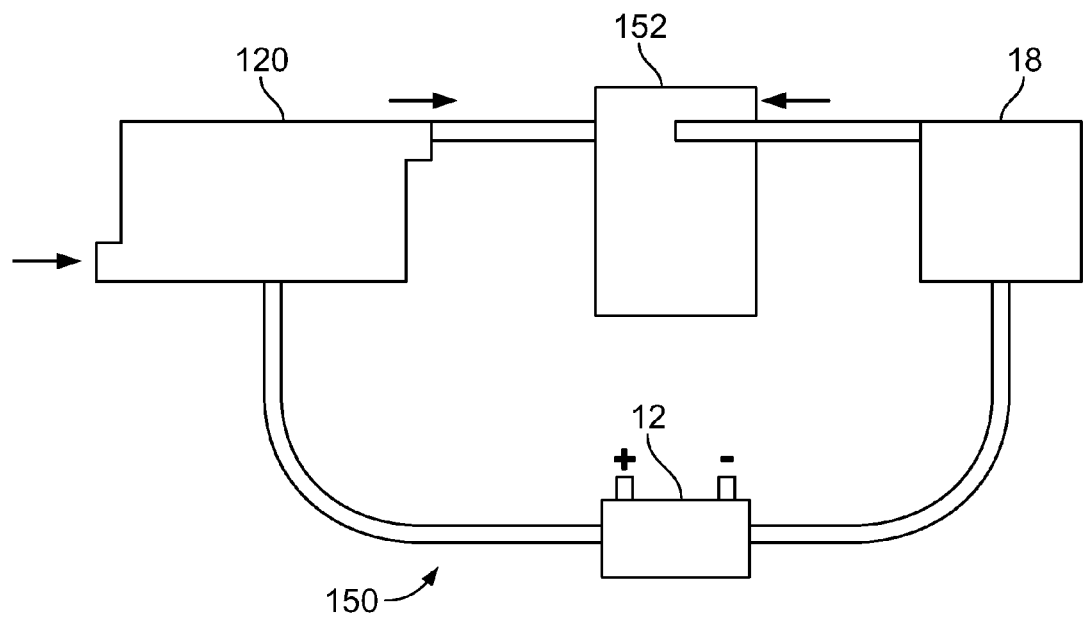
FIG. 6 depicts a hydrolysis system according to the embodiments of FIG. 1 and FIG. 4.

As depicted in FIG. 6, an embodiment of a hydrolysis system for a vehicle engine 150 may include a hydrolysis fuel gas unit 10 and a heated automobile air box 120, both connected to the air intake manifold 150 of an automobile. The pulse width modulator of the hydrolysis fuel gas unit 10 is connected to the automobile battery 12, and for a halogen lamp embodiment of a heater air box, the lamp is also connected to the automobile battery 12. Other embodiments may use the hot water embodiment of an air box 140. The air box 120 provides heated fresh air and the hydrolysis system 150 simultaneously provides fuel gas to the air intake of the vehicle.

An embodiment of a method for preparing a hydrolysis fuel gas unit may include:

providing hydrolysis plates having upper and lower apertures, such as a lower, round aperture for electrolyte and an upper, crescent-shaped aperture for fuel gas;

washing the hydrolysis plates in vinegar or acetic acid;

allowing the plates to air dry;

wiping the plates down with acetone, in order to help remove any oil perhaps from the manufacturer;

assembling the hydrolysis fuel gas unit, such as by aligning the interior plates and gaskets between outer faceplates and connecting the faceplates with conductive bolts;

after assembling the unit, pumping and recirculating citric acid at between 140 and 160° F., preferably 150° F. degrees, through aligned upper and lower apertures of the plates for 8 to 12 minutes, preferably 10 minutes; and allowing the system to air dry.

This may help take the excess iron and loose iron fragments out of stainless steel plates. When used in a hydrolysis system for an automobile, this may help prevent discoloring because there is little or no excess iron to rust.

Embodiments may include a device for producing a fuel gas to a vehicle having an engine with an air intake and a radiator, comprising an electrolysis unit that retains an electrolyte and produces a fuel gas; a reservoir to contain the fuel gas and electrolyte provided from the electrolysis unit; an electrolyte pump that returns electrolyte from the reservoir to the electrolysis unit; an expansion tank that receives the fuel gas and which includes an interior cavity adapted to carry hot water from the radiator of the vehicle, to expand the fuel gas; a spray tube that feeds the fuel gas from expansion tank to the air intake of the vehicle's engine; and a pulse width modulator that provides pulse-width-modulated power to the electrolysis unit and the electrolyte pump. In embodiments, the electrolyte includes ammonia, and the fuel gas includes gaseous hydrogen, gaseous oxygen, and gaseous ammonia.

I claim:

1. A device comprising:

an electrolysis unit having a plurality of spaced, generally parallel, conductive plates and an electrolyte between the plates that produce fuel gas including hydrogen and oxygen by electrolysis;

a reservoir that receives the fuel gas from the electrolysis unit and stores the fuel gas and electrolyte;

an electric pump that pumps the electrolyte from the reservoir to the electrolysis unit;

a pulse width modulator that provides DC power to the conductive plates and to the pump;

a dryer having a filter that removes water from the fuel gas;

an expansion tank having an interior cavity that expands the fuel gas and a conduit within the cavity that heats the fuel gas with circulating hot water; and a spray tube that outputs the fuel gas.

2. The device of claim 1, wherein the electrolyte includes liquid ammonia, and the fuel gas includes hydrogen vapor, oxygen vapor, and ammonia aerosol.

3. The device of claim 1, wherein the device is adapted for use in a vehicle having an engine, a radiator, and a battery;

the pulse width modulator receives power from the battery;

the expansion tank receives and returns hot water from the radiator;

the spray tube feeds the fuel gas into an air intake of the engine; and the electrolysis unit and the reservoir are mounted within the vehicle near the engine.

4. The device of claim 1, wherein:

a front plate and a rear plate have a common, first electrical connector, adapted to be connected to a power source at a first polarity;

a central interior plate has a second electrical connector, adapted to be connected to the power source at a second polarity; and a plurality of remaining interior plates are neutral and do not directly connect to the power source.

5. The device of claim 1 wherein the electrolysis unit has 7 conductive plates stacked in a row, and the plates have the following polarity from front to rear: negative, neutral, neutral, positive, neutral, neutral, and negative (−NN+NN−).

6. The device of claim 1 wherein the electrolysis unit has 10 conductive plates stacked in a row including 2 central interior plates, and the plates have the following polarity from front to rear: negative, neutral, neutral, positive, neutral, neutral, positive, neutral, neutral, and negative (−NN+NN+NN−).

7. The device of claim 1, wherein:

a front faceplate and a rear faceplate are generally circular with a first diameter, and are retained and electrically connected together by a plurality of conductive bolts equally spaced around rims of the faceplates, thereby providing a housing for the electrolysis unit;

a plurality of interior plates between the faceplates are generally circular with a second diameter that is less than the first diameter, so that the interior plates to not touch the conductive bolts; and a central interior plate further has an electrical connection tab with an electrical connection aperture, the tab extending out and between two of the conductive bolts so that the tab does not touch any of the conductive bolts.

8. The device of claim 1, wherein:

the conductive plates are generally circular;

a rear faceplate is solid;

a front faceplate and a plurality of interior plates each have a lower and an upper aperture;

the plates are stacked in the electrolysis unit so that the apertures align with each other and form passages for liquid through the electrolysis unit; and the plates are combined with gaskets between the plates to make an air-tight electrolysis unit that receives electrolyte into the lower aperture of the front faceplate and provides fuel gas out of the upper aperture in the front faceplate.

9. The device of claim 8, wherein the upper aperture is crescent-shaped, having a generally flat lower edge, parallel with and above a level of liquid electrolyte in the electrolysis unit, and having an upper edge forming an arc that conforms to outer rims of the conductive plates.

10. The device of claim 1, wherein the filter in the dryer is a nylon mesh cloth that fills a cross section of the dryer so that fuel gas passing through the dryer passes through the filter.

11. The device of claim 1, wherein:

the expansion tank receives the fuel gas from a gas input line;

the cavity in the expansion tank is significantly larger than the gas input line so that the fuel gas expands within the cavity; and the expansion tank has a hot water input that receives the hot water from a radiator and a hot water output that returns the water after the water circulates through the conduit, thereby heating the fuel gas utilizing hot water from the radiator.

12. The device of claim 1, further comprising:

a fuel gas input line having an input line diameter that provides fuel gas at an input velocity into the expansion tank; and a fuel gas output line having an output line diameter that provides fuel gas at an output velocity out of the expansion tank;

wherein the output line diameter is substantially less than the input line diameter so that the output velocity of the fuel gas is greater than the input velocity.

13. The device of claim 1, further comprising:

a plurality of fuel gas conduits that transport the fuel gas between the electrolysis unit, the reservoir, and the expansion tank;

wherein at least some of the fuel gas conduits have two ends and a conduit constricting element at one or both ends, thereby increasing a velocity of the fuel gas that passes through the conduit.

14. The device of claim 1, further comprising:

an air box that receives air, filters the air, and provides the air to an air intake of a vehicle engine; and a heating element in the air box that warms the air before the air is provided to the vehicle.

15. The device of claim 14, wherein the heating element comprises:

a halogen lamp, powered by a battery of the vehicle; and a thermostat at a distance from the lamp that controls whether the lamp is on or off;

wherein the air flows past the lamp, thereby heating the air.

16. The device of claim 14, wherein the heating element comprises:

a hot water inlet that receives hot water from a radiator of the vehicle;

a hot water outlet that returns the hot water to the radiator; and an air heater conduit made of heat-conductive material;

wherein the hot water circulates through the conduit and the air flows past the conduit, thereby heating the air.

17. A system for a vehicle having an engine, a radiator, and a battery, the system comprising:

an electrolysis unit having a plurality of spaced, generally parallel, generally circular conductive plates and an electrolyte including liquid ammonia between the plates that produce fuel gas including, hydrogen vapor, oxygen vapor, and ammonia aerosol;

the plates including a front faceplate and a rear faceplate having a common negative electrical connector, a central interior plate having a positive electrical connector, and a plurality of neutral plates not directly electrically connected;

the rear plate being solid, and the front and interior plates having lower and upper crescent-shaped apertures that align with each other and form passages to pass electrolyte in through the lower apertures and fuel gas out through the upper apertures;

a reservoir that receives the fuel gas from the electrolysis unit and stores the fuel gas and electrolyte;

an electric pump that pumps the electrolyte from the reservoir to the electrolysis unit;

a pulse width modulator that receives power from the battery and provides DC power to the conductive plates and to the pump;

a dryer having a mesh cloth filter that removes water from the fuel gas;

an expansion tank having an interior cavity that is larger than a fuel gas input line to expand the fuel gas, and a conduit within the cavity that heats the fuel gas with circulating hot water from the radiator;

a plurality of fuel gas conduits having a conduit constricting element at one or both ends, thereby increasing a velocity of the fuel gas that passes through the conduit;

a spray tube that feeds the fuel gas into an air intake of the engine; and an air box that with a heating element that heats and filters fresh air and provides the air to the air intake of the engine, the heat element including either an electric lamp powered by the battery or a hot water conduit that circulates hot water from the radiator.

18. A method for providing fuel gas, comprising:
providing an electrolysis unit having conductive plates;
providing an electrolyte for the electrolysis unit that includes ammonia;
utilizing an electrolysis unit to produce fuel gas including hydrogen and oxygen;
storing the fuel gas and electrolyte in a reservoir;
pumping the electrolyte from the reservoir to the electrolysis unit;
powering the conductive plates and the pump with a pulse width modulator;
filtering and drying the fuel gas to remove water;
expanding and heating the fuel gas with circulating hot water; and
spraying the fuel gas out.

19. The method of claim 18, further comprising:
providing an air box having a heating element and a filter inside the air box;
receiving fresh air into the air box;
heating the air with the heating element;
filtering the air with the filter;
providing the heated air from the air box to an air intake of a vehicle engine; and
simultaneously providing the fuel gas from the electrolysis unit to the air intake.

20. The method of claim 18, wherein the step of providing an electrolysis unit further comprises:
providing hydrolysis plates having upper and lower apertures;
washing the plates in vinegar or acetic acid;
allowing the plates to air dry;
wiping the plates down with acetone;
assembling the plates with bolts and gaskets to provide an electrolysis unit having aligned upper and lower apertures;
pumping and recirculating citric acid at between 140 and 160° F. through the apertures for 8 to 12 minutes; and
allowing the unit to air dry.

* * * * *